United States Patent
Liu et al.

(10) Patent No.: US 12,557,062 B2
(45) Date of Patent: Feb. 17, 2026

(54) METHOD AND APPARATUS FOR PROCESSING DATA FLOW OF POSITIONING BASE STATION, DEVICE AND COMPUTER-READABLE MEDIUM

(71) Applicants: GREE ELECTRIC APPLIANCES (WUHAN) CO., LTD, Wuhan (CN); GREE ELECTRIC APPLIANCES, INC. OF ZHUHAI, Zhuhai (CN); ZHUHAI LEAYUN TECHNOLOGY CO., LTD, Zhuhai (CN)

(72) Inventors: Miaoquan Liu, Zhuhai (CN); Jiehua Wu, Zhuhai (CN); Gao Chen, Zhuhai (CN); Yanyu Chen, Zhuhai (CN); Yaqi Ma, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN); ZHUHAI LEAYUN TECHNOLOGY CO. LTD., Zhuhai (CN)

( * ) Notice: Subject to any disclaimer, the term of this patent is extended or adjusted under 35 U.S.C. 154(b) by 485 days.

(21) Appl. No.: 18/005,135

(22) PCT Filed: May 12, 2021

(86) PCT No.: PCT/CN2021/093306
§ 371 (c)(1),
(2) Date: Jan. 11, 2023

(87) PCT Pub. No.: WO2022/033094
PCT Pub. Date: Feb. 17, 2022

(65) Prior Publication Data
US 2023/0262644 A1    Aug. 17, 2023

(30) Foreign Application Priority Data
Aug. 14, 2020 (CN) .......................... 202010819164.2

(51) Int. Cl.
*H04W 64/00* (2009.01)

(52) U.S. Cl.
CPC .................................. *H04W 64/00* (2013.01)

(58) Field of Classification Search
CPC ........ H04W 4/02; H04W 64/00; H04L 67/52; H04L 69/22
(Continued)

(56) References Cited

U.S. PATENT DOCUMENTS

2015/0099477 A1* 4/2015 Sato .......................... G01S 1/00
455/90.1
2018/0212684 A1* 7/2018 Aoyama ............. G06F 3/04845
(Continued)

FOREIGN PATENT DOCUMENTS

| CN | 108934034 A | 12/2018 | |
|---|---|---|---|
| CN | 110245192 A | 9/2019 | |
| WO | WO-2016188432 A1 * | 12/2016 | ............ H04W 76/28 |

OTHER PUBLICATIONS

International Search Report for corresponding International App. No. PCT/CN2021/093306, mailed Aug. 3, 2021, 2 pages.

*Primary Examiner* — Joseph Arevalo
(74) *Attorney, Agent, or Firm* — Armstrong Teasdale LLP (57) ABSTRACT

The present disclosure relates to a method and an apparatus for processing a data flow of a positioning base station, a device and a computer readable medium. The method includes: extracting, under the condition that a data packet to be processed which is sent by the positioning base station is received, a first identifier carried in the data packet to be processed; screening out a first data packet by using the first identifier, where the first data packet is a data packet to be processed including a distance from the positioning base station to a target position; extracting a second identifier carried in the first data packet, where second identifiers carried in different data packets to be processed sent by the (Continued)

same positioning base station vary; and determining, under the condition that time indicated by the second identifier is target time, the first data packet as a target data packets.

16 Claims, 3 Drawing Sheets

(58) Field of Classification Search
USPC ..... 455/456.1, 41.3, 416, 466, 456.2, 404.1, 455/434
See application file for complete search history.

(56) References Cited

U.S. PATENT DOCUMENTS

| 2018/0310129 | A1* | 10/2018 | Xie | H04W 4/026 |
| 2022/0321293 | A1* | 10/2022 | Ren | H04L 5/0048 |
| 2022/0386273 | A1* | 12/2022 | Hong | H04W 72/0453 |

* cited by examiner

METHOD AND APPARATUS FOR PROCESSING DATA FLOW OF POSITIONING BASE STATION, DEVICE AND COMPUTER-READABLE MEDIUM

CROSS-REFERENCE TO RELATED APPLICATION

The present application is a National Stage Entry of International Application No. PCT/CN2021/093306, filed on May 12, 2021, which claims the priority to Chinese Patent Application No. 202010819164.2, filed to the Chinese Patent Office on Aug. 14, 2020 and entitled "Method and Apparatus for Processing Data Flow of Positioning Base Station, Device and Computer Readable Medium," the contents of which are incorporated herein in their entirety by reference.

TECHNICAL FIELD

The present disclosure relates to the technical field of wireless positioning, in particular to a method and an apparatus for processing a data flow of a positioning base station, a device and a computer readable medium.

BACKGROUND

Featuring a high transmission rate, large space capacity, low cost, low power consumption, etc., the wireless carrier communication technology has been applied to base stations, radars, etc. in increasingly wide fields. Particularly, ultra wideband (UWB) featuring better performance and higher accuracy is especially suitable for short-distance indoor positioning. At present, mature UWB positioning algorithms include a time of arrival (TOA) algorithm, a time difference of arrival (TDOA) algorithm, an angle of arrival (AOA) algorithm, etc. The TOA algorithm computes linear distances between UWB positioning tags and positioning base stations through time of flight (TOF), and the positioning base stations send, in the form of data flows, data of the linear distances from each positioning tag computed every moment to a base station data receiving and processing system for computation of coordinates of the positioning tags. As for computation of the coordinates of the positioning tags in the TOA positioning algorithm, in the process of computing two-dimensional coordinates of the positioning tags at each time point, linear distances between a positioning tag at a current time point and three positioning base stations distributed in different positions are required. As for computation of three-dimensional coordinates of the positioning tag at each time point, the base station data receiving and processing system is required to obtain distance data of four base stations at each time point. Increase in demand for positioning services stimulates increase in the number of positioning tags and positioning base stations accordingly, causing the problems of disordered data flows, difficult screening and poor real-time performance during data transmission to be gradually exposed.

According to a method used in the related technology at present, an inertial measurement element is added to a measurement object, and a filtering algorithm is used to compute data collected by the inertial measurement element to obtain positions of the positioning tags. Although the related technology can reduce signal interference and compute the coordinates of the positioning tags with high accuracy, there are still some problems in the process of data transmission, such as disordered data flows, susceptibility to data loss, poor real-time performance and poor scalability of computation systems.

An effective solution to the above problems is still unavailable.

SUMMARY

The present disclosure provides a method and an apparatus for processing a data flow of a positioning base station, a device and a computer readable medium.

In a first aspect, the present disclosure provides a method for processing a data flow of a positioning base station. The method includes: under the condition that a data packet to be processed is received, a first identifier is extracted carried in the data packet to be processed, where the data packet to be processed is sent by the positioning base station, and the first identifier is set to indicate a type of the data packet to be processed; a first data packet is screened out by using the first identifier, where the first data packet is a data packet to be processed including a distance from the positioning base station to a target position; a second identifier is extracted carried in the first data packet, where the second identifier is set to indicate time information of the first data packet, and second identifiers carried in different data packets to be processed sent by the same positioning base station vary; and under the condition that the time information indicated by the second identifier is target time, the first data packet is determined as a target data packet, where the target time is time when the positioning base station collects the distance to the target position.

In a second aspect, the present disclosure provides an apparatus for processing a data flow of a positioning base station. The apparatus includes: a first identifier extraction component configured to extract, under the condition that a data packet to be processed is received, a first identifier carried in the data packet to be processed, where the data packet to be processed is sent by the positioning base station, and the first identifier is set to indicate a type of the data packet to be processed; a data package type identification component configured to screen out a first data packet by using the first identifier, where the first data packet is a data packet to be processed including a distance from the positioning base station to a target position; a second identifier extraction component configured to extract a second identifier carried in the first data packet, where the second identifier is set to indicate time information of the first data packet, and second identifiers carried in different data packets to be processed sent by the same positioning base station vary; and a data package partitioning component configured to determine, under the condition that the time information indicated by the second identifier is target time, the first data packet as a target data packet, where the target time is time when the positioning base station collects the distance to the target position.

In a third aspect, the present disclosure provides a computer device. The computer device includes a memory and a processor, where a computer program executable on the processor is stored in the memory, and the processor implements steps of the method according to any one of the first aspect when executing the computer program.

In a fourth aspect, the present disclosure further provides a computer readable medium, including a nonvolatile program code executable by a processor, the program code causing the processor to execute the method according to any one of the first aspect.

BRIEF DESCRIPTION OF THE DRAWINGS

Accompanying drawings described herein are incorporated in the specification as an integral part thereof, describe examples consistent with the present disclosure, and are used to explain principles of the present disclosure together with the specification.

To describe technical solutions in the embodiments of the present disclosure or in the related technologies more clearly, accompanying drawings required in descriptions of the embodiments or in the related technologies will be described briefly below. Apparently, a person of ordinary skill in the art can still derive other accompanying drawings from these accompanying drawings without creative efforts.

DETAILED DESCRIPTION OF THE EMBODIMENTS

To make the objectives, technical solutions, and advantages of embodiments of the present disclosure clearer, the technical solutions in the embodiments of the present disclosure will be clearly and completely described below with reference to the accompanying drawings in the embodiments of the present disclosure. Apparently, the described embodiments are some rather than all of the embodiments of the present disclosure. All other embodiments derived by a person of ordinary skill in the art based on the described embodiments of the disclosure without creative efforts shall fall within the protection scope of the present disclosure.

In the following description, suffixes such as "module", "component" or "unit" used to represent elements are merely used to facilitate description of the present disclosure, and have no specific meanings themselves. Therefore, "module" and "component" can be interchanged.

First of all, some nouns or terms in the process of describing the embodiments of the present disclosure are applicable to the following explanations:

UWB short for Ultra Wideband is a kind of wireless carrier information technology using a frequency bandwidth of 1 GHz or above. Instead of sinusoidal carriers, UWB uses nanosecond sine wave and narrow pulses to transmit data. UWB positioning system consists of an application layer, a service layer, a transmission layer and a perception layer (a positioning base station and a positioning tag). A backbone network of transmission layer uses a wired or wireless communication manner.

The perception layer mainly includes the positioning base station and the positioning tag. The base station and the tag are core devices of the positioning system. The tag will broadcast a radio signal with a tag ID number per time slot. After the positioning base station receives the signal sent by the tag, a timestamp and the tag ID number of the received signal are transmitted to the service layer by means of the backbone network to complete positioning of the tag. The base station can also receive an instruction issued by the applicable layer to complete relevant settings. An indoor positioning base station and positioning tag are hardware components of the UWB positioning system. The positioning base stations are distributed on the geometric edge of a scene area, and cover the signal in the area. The indoor positioning base station mainly acts to detect tag data information and upload same to a server for summary analysis. The positioning tag is attached to a surface of a positioning object. When the tag enters the signal coverage scope of the base station, connection with the base station is automatically built. According to the application requirements, different attachment solutions, such as hanging and pasting, can be made for the positioning tag, and a size and a shape may also be different accordingly if the positioning object varies.

The transmission layer is also called a backbone communication network (referred to as the "backbone network" for short), and acts as a data transmission channel among the base station, the service layer and the application layer to downlink related instructions of the application layer to base station, and uplink original positioning data (a distance between the tag and the base station) to service layer with wired optical fiber.

The service layer measures the distance with the tag and the positioning base station covering the area, and a top layer computes tag coordinates using positions and tag distances of each base station through a TDOA algorithm or the TOA algorithm. In addition, the service layer also provides flexible device management and network management functions, as well as various front-end functions and application interfaces.

The application layer obtains a specific position of the positioning tag through the service layer, and displays the position of the tag in real time in the form of one-dimensional, two-dimensional or three-dimensional maps, and provides the functions of track playback, person information management and calling for help.

According to a method used in the related technology, inertial measurement elements are added to a measurement object, a filtering algorithm is used to compute data collected by the inertial measurement elements to obtain positions of the positioning tags. Although the related technology can reduce signal interference and compute the coordinates of the positioning tags with high accuracy, there are still some outstanding problems in the process of data transmission, such as disordered data flows, susceptibility to data loss, poor real-time performance and poor scalability of computation systems.

To solve the problems in the background, according to an aspect of the embodiments of the present disclosure, some embodiments of a method for processing a data flow of a positioning base station is provided.

Figure 1:
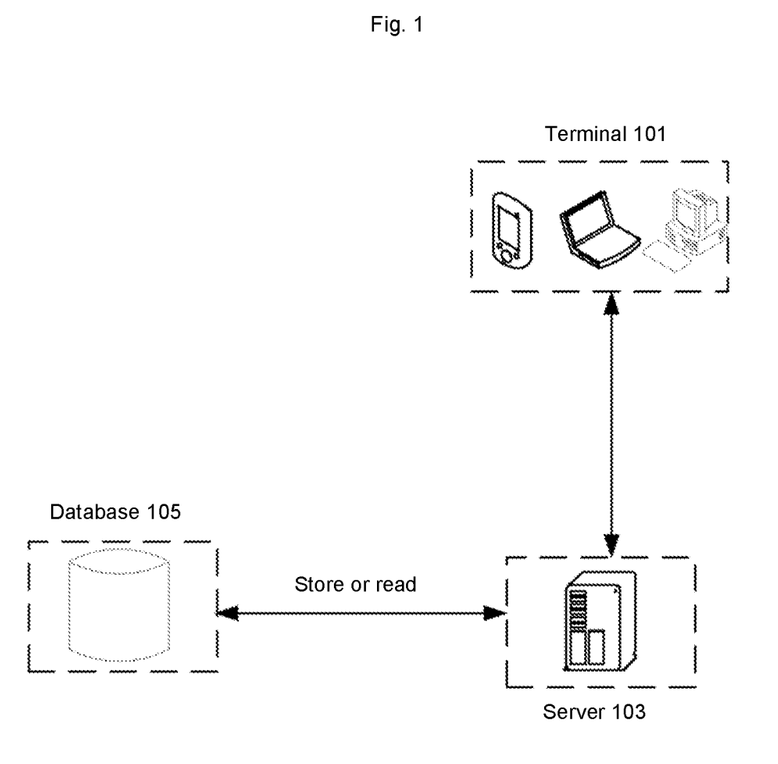
FIG. 1 is an optional schematic diagram of a hardware environment of a method for processing a data flow of a positioning base station according to some embodiments of the present disclosure.

Optionally, in the embodiments of the present disclosure, the above method for processing a data flow of a positioning base station may be applied to a hardware environment composed of a terminal 101 and a server 103 as shown in FIG. 1. As shown in FIG. 1, the server 103 is connected to the terminal 101 by means of a network, and may be used to provide service for the terminal or clients mounted on the terminal. A database 105 may be arranged on the server or independently of the server, and is arranged to provide data storage service for the server 103. The above network includes, but is not limited to, a wide area network, a metropolitan area network or a local area network. The terminal 101 includes, but is not limited to, a personal computer (PC), a mobile phone, a tablet computer, etc.

Figure 2:
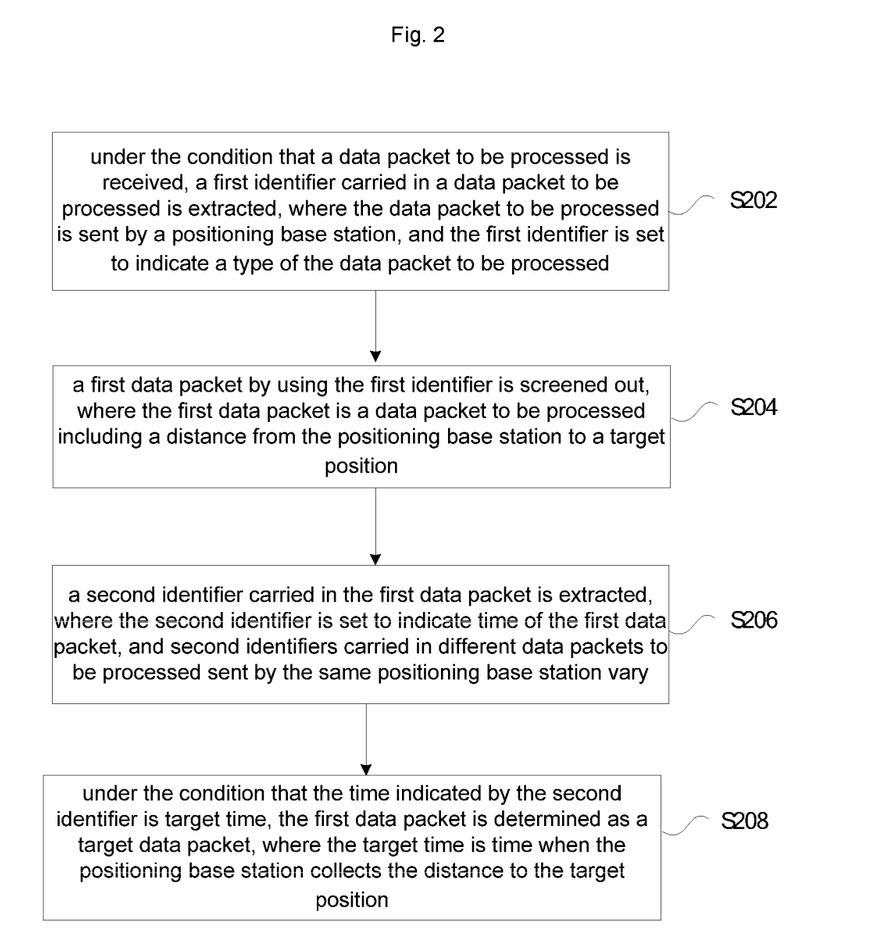
FIG. 2 is an optional flowchart of a method for processing a data flow of a positioning base station according to some embodiments of the present disclosure.

The method for processing a data flow of a positioning base station in the embodiments of the present disclosure may be executed by the server 103 or jointly executed by the server 103 and the terminal 101. As shown in FIG. 2, the method may include:

S202, under the condition that a data packet to be processed is received, a first identifier carried in a data packet to be processed is extracted, where the data packet to be processed is sent by a positioning base station, and the first identifier is set to indicate a type of the data packet to be processed.

In the embodiments of the present disclosure, the positioning base station may be an ultra-wideband positioning base station, and a relative distance between the positioning tag and the ultra-wideband positioning base station is computed in real time by a TOF ranging method, and the ultra-wideband positioning base station sends the computed data packet including the relative distance to a base station data flow receiving and processing system in real time. In addition, the ultra-wideband positioning base station may also generate a data packet including merely a state of the base station, and send the data packet to the base station data flow receiving and processing system.

Therefore, the above data packets to be processed include two types of data packets, one containing the relative distance between the positioning tag and the ultra-wideband positioning base station, and the other containing merely the state of the positioning base station. The data packet to be processed carries the first identifier, and the first identifier is a type identifier and may be used to distinguish two types of data packets.

Each of the ultra-wideband positioning base station may regularly generate data packets including data packet type identification command words, base station IDs, running state, etc. A command word field in each data packet may be used as data packet type identifier, and the data packet is sent to the base station data flow processing system in a hexadecimal string format.

When communicating with the positioning tag, each of the ultra-wideband positioning base station may regularly generate data packets including data packet type identification command words, base station IDs, tag IDs, relative distances between the base station and the tag, batch count values, etc. A command word field in each data packet may be used as data packet type identifier, and the data packet is sent to the base station data flow processing system in a hexadecimal string format.

In some embodiments, the format of the data packet including the relative distance between the positioning tag and the ultra-wideband positioning base station may be shown in Table 1, and the format of the data packet including merely the state of the positioning base station may be shown in Table 2:

TABLE 1

| Field name | Number of bytes | Description |
| --- | --- | --- |
| Frame header | 2 bytes | OxFF. OXFF |
| Command word | 1 byte | OxOA (indicating that the data are base station information uploaded regularly) |
| Valid data length | 1 byte | 0x03 (excluding check bits, frame headers and command words) |
| Valid data data5-data6 | 2 bytes | Base station ID |
| Valid data data7 | 1 byte | 0x01/0x00 (used to indicate a state of the base station, 0x01 indicates normal, and 0x00 indicates abnormality) |
| Check bit | 1 byte | The XOR check value from the frame header to the valid data is first 8 bits. |

TABLE 2

| Field name | Number of bytes | Description |
| --- | --- | --- |
| Frame header | 2 bytes | OxFF.OXFF |
| Command word | 1 byte | OxOB (indicating that the data are the relative distance between the positioning tag uploaded regularly and the base station) |
| Valid data length | 1 byte | 0x14 (excluding check bits, frame headers and command words) |
| Valid data data5-data6 | 2 bytes | Base station ID |
| Valid data data7 | 1 byte | OXFF (separator) |
| Valid data data8-data8 | 2 bytes | Tag ID |
| Frame batch count value | 2 bytes | Data of the same batch can be obtained based on the count value |
| Valid data data11 | 1 byte | Electric quantity of the tag |
| Data12-data13 | 2 bytes | Relative distance between the base station and the tag (in cm) |
| Check bit | 1 byte | The XOR check value from the frame header to the valid data is first 8 bits. |

The positioning tag is a hardware component of the UWB positioning system, and may be attached to a surface of the positioning object. When the tag enters the signal coverage scope of the base station, connection with the base station is automatically built. According to the application requirements, different attachment solutions, such as hanging and pasting, can be made for the positioning tag, and a size and a shape may also be different accordingly if the positioning object varies. Common positioning tags include badge-type tags, hard hat-type tags, anti-disassembly bracelets, material positioning tags, etc.

S204, a first data packet by using the first identifier is screened out, where the first data packet is a data packet to be processed including a distance from the positioning base station to a target position.

In the embodiments of the present disclosure, the first data packet is a data packet to be processed including the distance from the ultra-wideband positioning base station to the target position, that is, a data packet including the relative distance between the positioning tag and the positioning base station. The first data packet may be a data packet which is collected by the ultra-wideband positioning base station at each time point and includes the relative distance between the positioning tag and the positioning base station. The first data packets may be sent by different ultra-wideband positioning base stations, and the first data packets received at the same time may be sent at different time. Distance collection time of the different first data packets sent by the same ultra-wideband positioning base station are different, and the first data packets with different collection time may be received at the same time point due to transmission delay.

S206, a second identifier carried in the first data packet is extracted, where the second identifier is set to indicate time of the first data packet, and second identifiers carried in different data packets to be processed sent by the same positioning base station vary.

In the embodiments of the present disclosure, the second identifier may be a time identifier for collecting the distance, or a batch identifier for indicating sending of the first data packet, and is set to partition the received first data packet into different batches, and distance collection time of the first data packets in the same batch is identical or basically identical.

In the process of data packet transmission, each ultra-wideband positioning base station sends the data packets of time points to the data flow receiving and processing system of the base station according to a sequence of data packet generation. Ideally, the data flow receiving and processing system of the base station may continuously receive at each time point the data packets including the relative distances sent at that time point by each base station for a specific positioning tag, but at each time point, it is impossible for each base station to completely synchronize generation time and sending time of the data packet including the relative distance at this time point. At this time point, timestamp values of data packets of each base station are not equal with slight differences, and there is a transmission delay during network transmission. Therefore, in the embodiments of the present disclosure, the second identifier may be set to merge the data packets at each time point in an orderly manner.

S208, under the condition that the time indicated by the second identifier is target time, the first data packet is determined as a target data packet, where the target time is time when the positioning base station collects the distance to the target position.

In the embodiments of the present disclosure, in order to compute the coordinates of the positioning tag at specific time, it is necessary to obtain a plurality of data packets including distances collected at the specific time, so the target data packet including distances collected at the target time may be selected according to the second identifier after the plurality of first data packets are obtained.

In the embodiments of the present disclosure, Apache Flume data collection framework may be used for receiving the data packet to be processed. Apache Flume is a highly available, highly reliable and distributed massive log collection, aggregation and transmission system. Apache Flume supports customizing of various data senders in a log system and is set to collect data. In addition, Apache Flume provides the capacity to simply process data and write same to various data receivers.

In some embodiments, tools such as Scribe, LogStash, Apache NiFi, Splunk, etc. of Facebook may also be used to receive data packets to be processed.

By using the technical solution of the present disclosure, all data packets including distances collected at a specific time point are screened out in an orderly manner by setting the type identifier and the batch identifier, thereby solving the problems of disordered data flows and susceptibility to data loss.

The embodiments of the present disclosure provide a method for computing coordinates of a positioning tag. In some embodiments, after the step that under the condition that the time indicated by the second identifier is target time, the first data packet is determined as a target data packet, the method further includes steps for computing the coordinates of the positioning tag as follows:

step 1, the target data packet is converted into an object to be processed, where the object to be processed is encoded in a data format supported by a preset streaming processing framework.

In the embodiments of the present disclosure, the target data packet is a data packet including the distance, collected at time being the target time, from the ultra-wideband positioning base station to the target position.

In the embodiments of the present disclosure, the above preset streaming processing framework may be Apache Flink, and Flink programs are mapped to streaming data flows after being executed. Each Flink data flow starts with one or more sources (data input, such as a message queue or a file system) and ends with one or more receivers (data output, such as a message queue, a file system or a database). Flink may perform any quantity of transformations on streams, the streams may be arranged as directed acyclic data flow graphs, allowing applications to branch and merge data flows.

According to format requirements of Flink data flows, the target data packet is converted into a plain official java object, for example, JavaBean.

In some embodiments, the preset streaming framework may also be Apache Spark, Gearpump, etc.

Step 2, at least a target quantity of objects to be processed are processed with the preset streaming processing framework, to obtain coordinates of a target positioning tag at the target time, where a position of the target positioning tag is the target position, the target quantity is a minimum quantity of the object to be processed required for obtaining the coordinates, and the coordinates are coordinates in a preset coordinate system.

In the embodiments of the present disclosure, in the process of computing two-dimensional coordinates of the positioning tags at each time point, linear distances between a positioning tag at a current time point and three ultra-wideband positioning base stations distributed in different positions are needed to be obtained. For computation of three-dimensional coordinates of the positioning tag at each time point, the base station data receiving and processing system is required to obtain distance data of four ultra-wideband base stations at each time point.

In some embodiments, the step that at least a target quantity of objects to be processed are processed with the preset streaming processing framework, to obtain coordinates of a target positioning tag at the target time may include:

Step 1, a distance from each ultra-wideband positioning base station to the target position and position coordinates of each ultra-wideband positioning base station are obtained, where the position coordinates of the ultra-wideband positioning base stations are coordinates in the preset coordinate system, and the quantity of the ultra-wideband positioning base stations is at least the target quantity.

In the embodiments of the present disclosure, obtaining the distance from the ultra-wideband positioning base station to the target position by means of the target data packet further requires obtaining of position coordinates of each ultra-wideband positioning base station. If two-dimensional coordinates of the positioning tag are computed, it is necessary to obtain position coordinates of at least three ultra-wideband positioning base stations in different positions, if three-dimensional coordinates of the positioning tag are computed, it is necessary to obtain position coordinates of at least four ultra-wideband positioning base stations in different positions, and the position coordinates above correspond to coordinates of a two-dimensional coordinate system and a three-dimensional coordinate system respectively.

Step 2: the distance and the position coordinates are processed in a preset processing manner to obtain the coordinates of the target positioning tag at the target time.

The above preset processing manner may be a TOA algorithm, a TDOA algorithm, etc.

The embodiments of the present disclosure provides a method for extracting a target data packet including a distance, collected at time being target time, and the technical solution of the present disclosure is further described by combining the steps shown in FIG. 2.

In some embodiments, S208 that under the condition that the time indicated by the second identifier is target time, the first data packet is determined as a target data packet may further include:

Step 1, a batch count value is extracted from the second identifier, where the batch count value is set to indicate a sending batch of the data packets to be processed, and time of data packets to be processed with the same batch count value is the same.

In the embodiments of the present disclosure, since it is impossible for each base station to completely synchronize generation time and sending time of the data packet including the relative distance at the target time, that is, at the target time, timestamp values of data packets of each base station are not equal with slight differences, and besides, there is a transmission delay during network transmission, therefore, the batch count value may be set to indicate the sending batch of the data packet, and data packets of the same batch means that time when the distance is collected is identical or basically identical. According to the batch count value carried in the data packet, the sending batch of the data packet may be determined, that is, the time when the distance is collected in the data packet may be determined, and the data packets of the same batch may be screened out.

Step 2, the first data packet having the batch count value being a target count value is determined as the target data packet, where the batch count value being the target count value indicates that the time of the first data packet is the target time.

In the embodiments of the present disclosure, time for computing the coordinates is the target time, the batch count value indicating the time for collecting the distance is the target time is the target count valve, and the data packet having the target count value is the target data packet.

The embodiments of the present disclosure further provide a method for screening state data packets of a base station and offloading two data packets.

In some embodiments, after step that under the condition that a data packet to be processed is received, a first identifier carried in the data packet to be processed is extracted, the method further includes:

Step 1, a second data packet is screened out by using the first identifier, where the second data packet is a data packet to be processed merely including a state of the positioning base station;

Step 2, the first data packet is imported into a first partition and the second data packet is imported into a second partition, where the first partition and the second partition are storage areas in message-oriented middleware.

In the embodiments of the present disclosure, the message-oriented middleware may be Apache Kafka. Kafka is a distributed publishing and subscribing message system with high throughput, and may process all action flow data of consumers in a website. Kafka may import the data packet (i.e. the first data packet) including the distance from the ultra-wideband positioning base station to the target position into a beacon-info topic partition (i.e. the first partition), and import the data packet (i.e. the second data packet) including merely the state of the ultra-wideband positioning base station into a station-info topic partition (i.e. the second partition). The above beacon-info topic partition and station-info topic partition are storage areas in Kafka.

In some embodiments, the above message-oriented middleware may further be RabbitMQ of LShift, ActiveMQ of Apache, RocketMQ of Alibaba, etc.

Step 3: the target data packet is imported into a third partition after the coordinates of the target position tag are obtained, where the third partition is a storage area in the message-oriented middleware, and the third partition is set to connect the message-oriented middleware to a downstream application.

In the embodiments of the present disclosure, after the coordinates of the positioning tag are computed, in order to use the coordinates of the positioning tag and the data packet by downstream applications, the data packet including the computed coordinates of the tag may be imported into the beacon-location-info topic partition of the Apache Kafka message-oriented middleware.

In some embodiments, before the step that under the condition that a data packet to be processed is received, a first identifier carried in the data packet to be processed is extracted, the method further includes steps for receiving the data packet to be processed from the ultra-wideband positioning base station as follows:

Step 1, a data transmission request sent by the positioning base station is received.

Step 2: reception confirming information is sent to the positioning base station in response to the data transmission request.

Step 3: communication connection with the ultra-wideband positioning base station is established to start receiving of the data packet to be processed under the condition of receiving secondary confirming information sent in response to the reception confirming information by the positioning base station.

In the embodiments of the present disclosure, a transmission control protocol (TCP) may be used for communication so as to receive the data packet to be processed.

In some embodiments, the base station data flow receiving and processing system may include the data collection framework, the message-oriented middleware and the streaming processing framework. As a log collection subsystem, the data collection framework is set to collect a real-time data flow sent by the positioning base station, pre-process the received data flow, and convert and offload same, and send a final receiving and processing result to a downstream data flow receiver. The message-oriented middleware is set to cache the data flow collected by the data collection framework. As a streaming processing subsystem, the streaming processing framework is set to extract, transform and compute, in the form of the data flow, a data sequence which is cached in Apache Kafka, and contains the relative distance from the position tag to the ultra-wideband position base station, by subscribing to a topic of the Apache Kafka message-oriented middleware.

According to the present disclosure, the data packet containing the relative distance between the positioning tag and the ultra-wideband positioning base station at the target time point may be extracted through the type identifier and the batch identifier in the data packet, such that the data will not be disordered and the data packet will be merged according to the corresponding time point (batch), thus solving the problems of data disorder and susceptibility to data loss, and further enabling more accurate real-time coordinates to be obtained when the coordinates of the positioning tag is computed.

Figure 3:
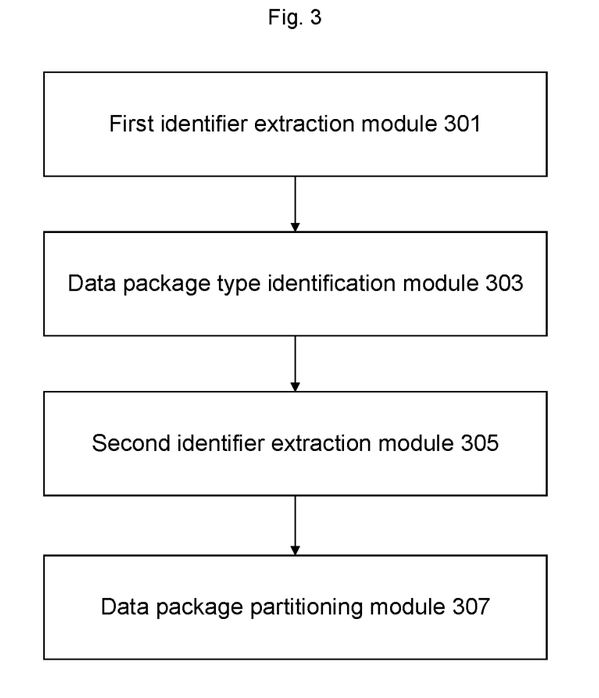
FIG. 3 is an optional step diagram of an apparatus for processing a data flow of a positioning base station according to some embodiments of the present disclosure.

According to still another aspect of the embodiments of the present disclosure, as shown in FIG. 3, an apparatus for processing a data flow of a positioning base station is provided. The apparatus includes a first identifier extraction component 301 configured to extract, under the condition that a data packet to be processed is received, a first identifier carried in the data packet to be processed, where the data packet to be processed is sent by the positioning base station, and the first identifier is set to indicate a type of the data packet to be processed; a data package type identification component 303 configured to screen out a first data packet by using the first identifier, where the first data packet is a data packet to be processed including a distance from the positioning base station to a target position; a second identifier extraction component 305 configured to extract a second identifier carried in the first data packet, where the second identifier is set to indicate time of the first data packet, and second identifiers carried in different data packets to be processed sent by the same positioning base station vary; and a data package partitioning component 307 configured to determine, under the condition that the time indicated by the second identifier is target time, the first data packet as a target data packet, where the target time is time when the positioning base station collects the distance to the target position.

It should be noted that the first identifier extraction component 301 in this embodiment may be set to perform S202 in this embodiment, the packet type identification component 303 in this embodiment may be set to perform S204 in this embodiment, the second identifier extraction component 305 in this embodiment may be set to perform S206 in this embodiment, and the data packet partitioning component 307 in this embodiment may be set to perform S208 in this embodiment.

It should be noted here that examples and application scenes implemented by the above components and corresponding steps are identical, but are not limited to those disclosed in the above embodiments. It should be noted that the above components, as a portion of the apparatus, may run in the hardware environment as shown in FIG. 1, and may be implemented by software or hardware.

In some embodiments, the apparatus for processing a data flow of a positioning base station further includes a format conversion component configured to convert the target data packet into an object to be processed, where the object to be processed is encoded in a data format supported by a preset streaming processing framework; and a coordinate computation component configured to process, with the preset streaming processing framework, at least a target quantity of objects to be processed to obtain coordinates of a target positioning tag at the target time, where a position of the target positioning tag is the target position, the target quantity is a minimum quantity of the object to be processed required for obtaining the coordinates, and the coordinates are coordinates in a preset coordinate system.

In some embodiments, the positioning base station includes an ultra-wideband positioning base station, and the coordinate computation component is further configured to obtain a distance from each ultra-wideband positioning base station to the target position and position coordinates of each ultra-wideband positioning base station, where the position coordinates of the ultra-wideband positioning base stations are coordinates in the preset coordinate system, and the quantity of the ultra-wideband positioning base stations is at least the target quantity; and processing the distance and the position coordinates in a preset processing manner to obtain the coordinates of the target positioning tag at the target time.

In some embodiments, the apparatus for processing a data flow of a positioning base station further includes: a batch count value extraction component configured to extract the batch count value in the second identifier, the batch count value is set to indicate the sending batch of the data packet to be processed, and time of data packets to be processed with the same batch count value is the same; and a data packet merging component configured to determine the first data packet having the batch count value being a target count value as the target data packet, where the batch count value being the target count value indicates that the time of the first data packet is the target time.

In some embodiments, the apparatus for processing a data flow of a positioning base station further includes: a second data packet extraction component configured to screen out a second data packet by using the first identifier, where the second data packet is a data packet to be processed merely including a state of the positioning base station; a data package partitioning component configured to import the first data packet into a first partition and the second data packet into a second partition, where the first partition and the second partition are storage areas in message-oriented middleware; and an upstream and downstream connection component configured to import the target data packet into a third partition after obtaining the coordinates of the target position tag, where the third partition is a storage area in the message-oriented middleware, and the third partition is set to connect the message-oriented middleware to a downstream application.

In some embodiments, the apparatus for processing a data flow of a positioning base station further includes: a request receiving component configured to receive a data transmission request sent by the positioning base station; a request response component configured to send reception confirming information to the positioning base station in response to the data transmission request; and a connection establishment component configured to establish communication connection with the positioning base station to start receiving the data packet to be processed under the condition of receiving secondary confirming information sent in response to the reception confirming information by the positioning base station.

According to still another aspect of the embodiments of the present disclosure, a computer device is further provided. The computer device includes a memory and a processor, where a computer program executable on the processor is stored in the memory, and the processor implements steps described above when executing the computer program.

The memory and the processor in the above computer device communicate with each other by means of a communication bus and a communication interface. The communication bus may be a peripheral component interconnect (PCI for short) bus, an extended industry standard architecture (EISA for short) bus, etc. The communication bus may be classified into an address bus, a data bus, a control bus, etc.

The memory may include a random access memory (RAM for short) or a non-volatile memory such as at least one disk memory. Optionally, the memory may be at least one memory storage located far away from the aforementioned processor as well.

The processor may be a general-purpose processor, for example, a central processing unit (CPU for short) or a network processor (NP for short), or can be a digital signal processor (DSP for short), an application specific integrated circuit (ASIC for short), a field-programmable gate array (FPGA for short), or other programmable logic devices, a discrete gate or transistor logic device, a discrete hardware component, etc.

According to still another aspect of the embodiments of the present disclosure, a computer readable medium including a nonvolatile program code executable by a processor is further provided.

Optionally, in the embodiments of the present disclosure, the computer-readable medium is configured to store a program code configured for the processor to perform the following steps:

S202, under the condition that a data packet to be processed is received, a first identifier carried in a data packet to be processed is extracted, where the data packet to be processed is sent by a positioning base station, and the first identifier is set to indicate a type of the data packet to be processed.

S204, a first data packet by using the first identifier is screened out, where the first data packet is a data packet to be processed including a distance from the positioning base station to a target position.

S206, a second identifier carried in the first data packet is extracted, where the second identifier is set to indicate time of the first data packet, and second identifiers carried in different data packets to be processed sent by the same positioning base station vary.

S208, under the condition that the time indicated by the second identifier is target time, the first data packet is determined as a target data packet, where the target time is time when the positioning base station collects the distance to the target position.

In some embodiments, reference can be made to the examples described in the above embodiments for specific examples in this embodiment, which will not be repeated in this embodiment.

When this embodiment of the present disclosure is specifically implemented, reference can be made to the above embodiments having corresponding technical effects.

It can be understood that the embodiments described herein can be implemented by hardware, software, firmware, middleware, microcode or a combination thereof. For implementation by the hardware, the processing unit can be implemented in one or more application specific integrated circuits (ASIC), digital signal processing, (DSP), digital signal processing devices (DSPD), programmable logic devices (PLD), field-programmable gate arrays (FPGA), general-purpose processors, controllers, microcontrollers, microprocessors, other electronic units or combinations thereof set to perform the functions described in the present disclosure.

For implementation by the software, the technology described herein can be implemented by a unit that performs the functions described herein. The software can be stored in the memory and executed by the processor. The memory can be implemented in or out of the processor.

It conceivable by those skilled in the art that the units and algorithm steps of each example described in connection with the embodiments disclosed herein can be implemented by electronic hardware, or a combination of computer software and electronic hardware. Whether these functions are performed by hardware or software depends on the specific application and design constraints of the technical solution. Those skilled in the art can use different methods to implement the described functions for each particular application, but such implementation should not be considered to be beyond the scope of the present disclosure.

Those skilled in the art can clearly understand that, for the convenience and conciseness of description, the specific working processes of the above system, apparatus and units can refer to the corresponding processes in the practical embodiments of the above methods, and will not be repeated herein.

It should be understood that in the embodiments provided by the present disclosure, the apparatus and the method disclosed can be implemented in other manners. For example, the apparatus embodiments described above are merely schematic. For example, module division can be a logical function division and can have other division manners during actual implementation, for example, multiple modules or components can be combined or integrated into another system, or some features can be ignored or not executed. On the other hand, the shown or discussed coupling or direct coupling or communication connection with each other can be indirect coupling or communication connection through some interfaces, apparatuses or units, and can be in electrical, mechanical or other forms.

The units described as separated parts can or cannot be physically separated, and the parts displayed as units can or cannot be physical units, that is, they can be located in one place or distributed to multiple network units. Some or all of the units can be selected according to actual needs to achieve the purposes of the solutions of the embodiments.

In addition, functional units in the embodiments of the present disclosure can be integrated into one processing unit, or each unit can be physically present separately, or two or more units can be integrated into one unit.

If the functions are implemented in the form of the software functional units and sold or used as independent products, the functions can be stored in a computer readable storage medium. Based on such understanding, the technical solution of the present disclosure can be embodied in the form of software products in essence or in part that contributes to the prior art or a part thereof, the computer software products are stored in the storage medium, and include several instructions to make one piece of computer device (which can be a personal computer, a server, a network device, etc.) execute all or some steps of the method of each embodiment of the present disclosure. The foregoing storage medium includes a USB flash drive, a mobile hard disk drive, a read only memory (ROM), a random access memory (RAM), a diskette or optical disk, and other media that can store program codes. It should be further noted that in the description, relational terms such as "first" and "second" are merely used to distinguish one entity or one operation from another entity or another operation, and do not necessarily require or imply any such actual relationship or order among these entities or operations. In addition, the terms "include", "encompass" or any other variant thereof are intended to cover non-exclusive encompassing, such that a process, a method, an article or a device including a series of elements not only include those elements, but include other elements not listed clearly, or further include elements inherent to such process, method, article or device. In the case of no more limitations, the element limited by the sentence "including a . . . " does not exclude existence of another identical element in the process, method, article or device including the element.

What are described above are merely specific embodiments of the present disclosure, such that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to these embodiments shown herein, but will accord with the widest scope consistent with the principles and novel features applied herein.

What is claimed is:

1. A method for processing data of a positioning base station, comprising:

extracting, under the condition that a data packet to be processed is received, a first identifier carried in the data packet to be processed, wherein the data packet to be processed is sent by the positioning base station, and the first identifier is set to indicate a type of the data packet to be processed;

screening out a first data packet by using the first identifier, wherein the first data packet is a data packet to be processed comprising a distance from the positioning base station to a target position;

extracting a second identifier carried in the first data packet, wherein the second identifier is set to indicate time information of the first data packet, and second identifiers carried in different data packets to be processed sent by the same positioning base station vary; and determining, under the condition that the time information indicated by the second identifier is target time, the first data packet as a target data packet, wherein the target time is time when the positioning base station collects the distance to the target position, wherein after determining, under the condition that the time indicated by the second identifier is the target time, the first data packet as the target data packet, the method further comprises:

converting the target data packet into an object to be processed, wherein the object to be processed is encoded in a data format supported by a preset streaming processing framework; and processing, with the preset streaming processing framework, at least a target quantity of objects to be processed to obtain coordinates of a target positioning tag at the target time, wherein a position of the target positioning tag is the target position, the target quantity is a minimum quantity of the object to be processed required for obtaining the coordinates, and the coordinates are coordinates in a preset coordinate system.

2. The method as claimed in claim 1, wherein the positioning base station comprises ultra-wideband positioning base stations, and processing, with the preset streaming processing framework, at least the target quantity of the objects to be processed to obtain the coordinates of the target positioning tag at the target time comprises:

obtaining a distance from each of the ultra-wideband positioning base stations to the target position and position coordinates of each of the ultra-wideband positioning base stations, wherein the position coordinates of the ultra-wideband positioning base stations are coordinates in the preset coordinate system, and a quantity of the ultra-wideband positioning base stations is at least the target quantity; and processing the distance and the position coordinates in a preset processing manner to obtain the coordinates of the target positioning tag at the target time.

3. The method as claimed in claim 1, wherein determining, under the condition that the time indicated by the second identifier is the target time, the first data packet as the target data packet comprises:

extracting a batch count value from the second identifier, wherein the batch count value is set to indicate a sending batch of the data packets to be processed, and time information of the data packets to be processed with the same batch count value is the same; and determining the first data packet having the batch count value being a target count value as the target data packet, wherein the batch count value being the target count value indicates that the time information of the first data packet is the target time.

4. The method as claimed in claim 1, wherein after extracting, under the condition that the data packet to be processed is received, the first identifier carried in the data packet to be processed, the method further comprises:

screening out a second data packet by using the first identifier, wherein the second data packet is a data packet to be processed merely comprising a state of the positioning base station;

importing the first data packet into a first partition and the second data packet into a second partition, wherein the first partition and the second partition are storage areas in message-oriented middleware; and importing the target data packet into a third partition after obtaining the coordinates of the target position tag, wherein the third partition is a storage area in the message-oriented middleware, and the third partition is set to connect the message-oriented middleware to a downstream application.

5. The method as claimed in claim 1, wherein before extracting, under the condition that the data packet to be processed is received, the first identifier carried in the data packet to be processed, the method further comprises receiving the data packet to be processed from the positioning base station as follows:

receiving a data transmission request sent by the positioning base station;

sending reception confirming information to the positioning base station in response to the data transmission request; and establishing communication connection with the positioning base station to start receiving the data packet to be processed under the condition of receiving secondary confirming information sent in response to the reception confirming information by the positioning base station.

6. A computer device, comprising a memory and a processor, wherein a computer program executable on the processor is stored in the memory, and the processor implements steps of the method as claimed in claim 1 when executing the computer program.

7. A non-transitory computer readable medium, comprising a nonvolatile program code executable by a processor, the program code causing the processor to execute the method as claimed in claim 1.

8. The computer device as claimed in claim 6, wherein the positioning base station comprises ultra-wideband positioning base stations, and processing, with the preset streaming processing framework, at least the target quantity of the objects to be processed to obtain the coordinates of the target positioning tag at the target time comprises:

obtaining a distance from each of the ultra-wideband positioning base stations to the target position and position coordinates of each of the ultra-wideband positioning base stations, wherein the position coordinates of the ultra-wideband positioning base stations are coordinates in the preset coordinate system, and a quantity of the ultra-wideband positioning base stations is at least the target quantity; and processing the distance and the position coordinates in a preset processing manner to obtain the coordinates of the target positioning tag at the target time.

9. The computer device as claimed in claim 6, wherein determining, under the condition that the time indicated by the second identifier is the target time, the first data packet as the target data packet comprises:
   extracting a batch count value from the second identifier, wherein the batch count value is set to indicate a sending batch of the data packets to be processed, and time information of the data packets to be processed with the same batch count value is the same; and
   determining the first data packet having the batch count value being a target count value as the target data packet, wherein the batch count value being the target count value indicates that the time information of the first data packet is the target time.

10. The computer device as claimed in claim 6, wherein after extracting, under the condition that the data packet to be processed is received, the first identifier carried in the data packet to be processed, the method further comprises:
   screening out a second data packet by using the first identifier, wherein the second data packet is a data packet to be processed merely comprising a state of the positioning base station;
   importing the first data packet into a first partition and the second data packet into a second partition, wherein the first partition and the second partition are storage areas in message-oriented middleware; and
   importing the target data packet into a third partition after obtaining the coordinates of the target position tag, wherein the third partition is a storage area in the message-oriented middleware, and the third partition is set to connect the message-oriented middleware to a downstream application.

11. The computer device as claimed in claim 6, wherein before extracting, under the condition that the data packet to be processed is received, the first identifier carried in the data packet to be processed, the method further comprises receiving the data packet to be processed from the positioning base station as follows:
   receiving a data transmission request sent by the positioning base station;
   sending reception confirming information to the positioning base station in response to the data transmission request; and
   establishing communication connection with the positioning base station to start receiving the data packet to be processed under the condition of receiving secondary confirming information sent in response to the reception confirming information by the positioning base station.

12. The non-transitory computer readable medium as claimed in claim 7, wherein the positioning base station comprises ultra-wideband positioning base stations, and processing, with the preset streaming processing framework, at least the target quantity of the objects to be processed to obtain the coordinates of the target positioning tag at the target time comprises:
   obtaining a distance from each of the ultra-wideband positioning base stations to the target position and position coordinates of each of the ultra-wideband positioning base stations, wherein the position coordinates of the ultra-wideband positioning base stations are coordinates in the preset coordinate system, and a quantity of the ultra-wideband positioning base stations is at least the target quantity; and
   processing the distance and the position coordinates in a preset processing manner to obtain the coordinates of the target positioning tag at the target time.

13. The non-transitory computer readable medium as claimed in claim 7, wherein determining, under the condition that the time indicated by the second identifier is the target time, the first data packet as the target data packet comprises:
   extracting a batch count value from the second identifier, wherein the batch count value is set to indicate a sending batch of the data packets to be processed, and time information of the data packets to be processed with the same batch count value is the same; and
   determining the first data packet having the batch count value being a target count value as the target data packet, wherein the batch count value being the target count value indicates that the time information of the first data packet is the target time.

14. The non-transitory computer readable medium as claimed in claim 7, wherein after extracting, under the condition that the data packet to be processed is received, the first identifier carried in the data packet to be processed, the method further comprises:
   screening out a second data packet by using the first identifier, wherein the second data packet is a data packet to be processed merely comprising a state of the positioning base station;
   importing the first data packet into a first partition and the second data packet into a second partition, wherein the first partition and the second partition are storage areas in message-oriented middleware; and
   importing the target data packet into a third partition after obtaining the coordinates of the target position tag, wherein the third partition is a storage area in the message-oriented middleware, and the third partition is set to connect the message-oriented middleware to a downstream application.

15. The non-transitory computer readable medium as claimed in claim 7, wherein before extracting, under the condition that the data packet to be processed is received, the first identifier carried in the data packet to be processed, the method further comprises receiving the data packet to be processed from the positioning base station as follows:
   receiving a data transmission request sent by the positioning base station;
   sending reception confirming information to the positioning base station in response to the data transmission request; and
   establishing communication connection with the positioning base station to start receiving the data packet to be processed under the condition of receiving secondary confirming information sent in response to the reception confirming information by the positioning base station.

16. An apparatus for processing a data flow of a positioning base station, comprising:
   a first identifier extraction component configured to extract, under the condition that a data packet to be processed is received, a first identifier carried in the data packet to be processed, wherein the data packet to be processed is sent by the positioning base station, and the first identifier is set to indicate a type of the data packet to be processed;
   a data package type identification component configured to screen out a first data packet by using the first identifier, wherein the first data packet is a data packet to be processed comprising a distance from the positioning base station to a target position;
   a second identifier extraction component configured to extract a second identifier carried in the first data packet, wherein the second identifier is set to indicate time information of the first data packet, and second identifiers carried in different data packets to be processed sent by the same positioning base station vary; and a data package partitioning component configured to determine, under the condition that the time information indicated by the second identifier is target time, the first data packet as a target data packet, wherein the target time is time when the positioning base station collects the distance to the target position, a format conversion component configured to convert the target data packet into an object to be processed, wherein the object to be processed is encoded in a data format supported by a preset streaming processing framework; and a coordinate computation component configured to process, with the preset streaming processing framework, at least a target quantity of objects to be processed to obtain coordinates of a target positioning tag at the target time, wherein a position of the target positioning tag is the target position, the target quantity is a minimum quantity of the object to be processed required for obtaining the coordinates, and the coordinates are coordinates in a preset coordinate system.

* * * * *